United States Patent [19]
Coleman

[11] Patent Number: 6,011,704
[45] Date of Patent: Jan. 4, 2000

[54] AUTO-RANGING POWER SUPPLY

[75] Inventor: Charles Coleman, Fort Collins, Colo.

[73] Assignee: Sierra Applied Sciences, Inc., Boulder, Colo.

[21] Appl. No.: 08/966,400

[22] Filed: Nov. 7, 1997

[51] Int. Cl.[7] .......................... H02M 5/45; H02M 7/217; G05F 1/16
[52] U.S. Cl. ............................. 363/37; 363/67; 363/82; 323/258; 323/340
[58] Field of Search .................................. 363/37, 65, 67, 363/68, 69, 82; 323/255, 298, 332, 333, 340, 282, 284, 285, 225, 293

[56] References Cited

U.S. PATENT DOCUMENTS

| 4,103,324 | 7/1978 | Vandervelen et al. ................ 363/89 |
| 4,931,169 | 6/1990 | Scherer et al. .................... 204/298.11 |
| 4,936,960 | 6/1990 | Siefkes et al. ..................... 204/192.38 |
| 4,963,238 | 10/1990 | Siefkes et al. .................... 204/192.12 |
| 4,981,566 | 1/1991 | Wurczinger ......................... 204/192.13 |
| 5,006,213 | 4/1991 | Sichmann et al. .................. 204/192.14 |
| 5,009,764 | 4/1991 | Siefkes et al. ..................... 204/298.08 |
| 5,074,984 | 12/1991 | Sichman et al. ................... 204/192.14 |
| 5,108,571 | 4/1992 | Ludwig et al. ..................... 204/192.13 |
| 5,126,033 | 6/1992 | Szczyrbowski et al. .......... 204/298.08 |
| 5,192,894 | 3/1993 | Teschner ............................ 315/111.21 |
| 5,398,182 | 3/1995 | Crobsy .................................. 363/68 X |
| 5,427,669 | 6/1995 | Drummond ....................... 204/298.08 |
| 5,461,297 | 10/1995 | Crawford ............................ 363/67 X |
| 5,599,344 | 2/1997 | Paterson ................................ 606/34 |

FOREIGN PATENT DOCUMENTS

| 0553410 A1 | 8/1993 | European Pat. Off. . |
| 221202 A1 | 4/1985 | German Dem. Rep. . |
| 229160 A1 | 10/1985 | German Dem. Rep. . |
| 3919147 A1 | 12/1990 | Germany . |
| 3121389 A1 | 8/1992 | Germany . |
| 4113704 A1 | 10/1992 | Germany . |
| 57-69324 | 4/1982 | Japan . |
| 61-30665 | 2/1986 | Japan . |
| 63-190168 | 8/1988 | Japan . |
| 3-56671 | 3/1991 | Japan . |
| 3-61368 | 3/1991 | Japan . |
| 2045553 | 3/1980 | United Kingdom . |

OTHER PUBLICATIONS

Beisswenger, T. et al., "Economical Considerations on Modern Web Sputtering Technology", Society of Vacuum Coaters, 35th Annual Technical Coinferece Proceedings, pp. 128–134 (1992).

Anderson, L., "A New Technique for Arc Control in DC Sputtering", Society of Vacuum Coaters, 35th Annual technical Conference Proceedings, pp. 325–329 (1992).

Schatz, Doug, "The MDX as a Strategic Tool in reducing Arcing", Application Notes, Advanced Energy Industries, Inc. (1985).

*Primary Examiner*—Y. J. Han
*Attorney, Agent, or Firm*—Bruce E. Dahl, Esq.; Dahl & Osterloth LLP

[57] ABSTRACT

Autoranging power supply apparatus may comprise a power output section having a plurality of pairs of output terminals, each of which has a maximum voltage and current rating. A switching network associated with the power output section connects and disconnects the plurality of pairs of output terminals to the external load. A control system connected to the switching network operates the switching network in response to changes in the impedance of the external load to connect and disconnect to the external load selected ones of the plurality of pairs of output terminals of the power output section to compensate for impedance variations in the external load and to prevent from being exceeded the maximum voltage and current ratings for each of the plurality of pairs of output terminals.

23 Claims, 3 Drawing Sheets

AUTO-RANGING POWER SUPPLY

FIELD OF INVENTION

The present invention relates to power supplies for plasma processing systems in general and more specifically to power supplies for sputter deposition systems.

BACKGROUND

Plasma deposition refers to any of a wide variety of processes in which a plasma is used to assist in the deposition of thin films or coatings onto the surfaces of objects. For example, plasma deposition processes are widely used in the electronics industry to fabricate integrated circuits and other electronic devices, as well as to fabricate the magnetic tapes and disks used in audio, video, and computer applications. Plasma deposition processes may also be used to apply coatings to various objects to improve or change the properties of the objects. For example, plasma deposition processes may be used to apply wear resistant coatings to machine tools, while other types of coatings may be used to increase the corrosion resistance of other items, such as bearings, turbine blades, etc, thereby enhancing their performance. In still other applications, plasma deposition may be used to apply coatings to various types of surfaces in the optics and glass industries.

In most plasma deposition processes the plasma is created by subjecting a low-pressure process gas (e.g., argon) contained within a vacuum chamber to an electric field. The electric field, which is typically created between two electrodes, ionizes the process gas and creates the plasma. In the case of a DC sputter deposition plasma process, the material (commonly referred to as the target) to be deposited on the object or substrate is connected as the negative electrode (i.e., cathode), whereas some other element, commonly the vacuum chamber itself, is connected as the positive electrode or anode. Ionized process gas atoms comprising the plasma are accelerated toward and ultimately impact the negatively charged cathode/target, dislodging or sputtering atoms from the target material. The sputtered atoms subsequently condense on various items in the chamber, including the substrate that is to be coated. The substrate is usually positioned with respect to the target so that a majority of the sputtered target atoms condense on the surface of the substrate.

Sputter deposition processes of the type described above are usually referred to as "non-reactive" processes in that the sputtered atoms deposited on the surface of the substrate do not react with other materials. However, sputter deposition processes have also been developed wherein the target material is sputtered in the presence of a reactive material (e.g., oxygen or nitrogen gas). Such "reactive" sputtering processes may be used to deposit a film comprising the sputtered target material and the reactive species. A wide variety of compounds, such as $SiO_2$, $Al_2O_3$, $Si_3N_4$, and TiO, can be deposited by reactive sputter deposition processes.

While it is a relatively simple matter to connect a power supply (e.g., a DC power supply) to the electrodes and generate the plasma, it is considerably more difficult to produce and control the plasma so that the deposition process will consistently produce coatings of the desired quality. One of the main difficulties in this regard is that the plasma is generally quite unstable and is subject to significant, and perhaps rapid, variations in electrical impedance. These impedance variations may be related to a variety of factors, including the type of material being deposited, the pressure within the chamber, the strength of the magnetic field used to confine the plasma, the movement of fixtures within the chamber, and other extrinsic factors.

Regardless of their cause, the impedance variations create many problems relating to the power supply and the ability of the power supply to maintain the process at the desired operation point (e.g., power level). Consider, for example, a plasma process that is to be operated at a constant power of 8,000 watts. Suppose also that the initial impedance of the plasma is 80 ohms. At this operating point, the voltage potential between the electrodes is about 800 volts and the current in the plasma is about 10 amperes. Now, if the impedance of the plasma decreases to about 20 ohms, such as may occur when the target material is nearly depleted in a magnetron sputtering process, the voltage between the electrodes will decrease to about 400 volts while the current doubles to 20 amperes.

A power supply suitable for the foregoing process must be rated at 800 volts and 20 amperes so that it is able to provide the higher current required as the target material erodes. However, such a power supply is really twice as large as necessary in that its power rating would be 16 kilowatts, yet the process is only to be operated at 8 kilowatts. Such oversized power supplies are expensive and add to the cost of the overall process.

Partly in an effort to avoid the need to provide such oversized power supplies, some power supplies have been developed that utilize transformers with a variety of taps. The taps can be manually selected by the user to accommodate the voltage and current changes associated with the impedance changes of the plasma. Unfortunately, however, the transformer taps of such power supplies cannot be changed while the power supply is operating. Consequently, the process must be stopped so the user can change the tap to accommodate the impedance change. The process may then be restarted. Obviously, such an arrangement is cumbersome, inefficient, and adds to the overall cost of the process.

Consequently, a need remains for a power supply that can accommodate the impedance changes that commonly occur in plasma processing systems. Such a power supply should be able to deliver maximum power to the plasma over a wide range of impedances without the danger of overloading the power supply. Additional advantages could be realized if such a power supply could compensate for fairly large impedance variations, but without the need to first stop the process, then manually reconfigure the power supply.

SUMMARY OF THE INVENTION

Autoranging power supply apparatus according to the present invention may comprise a power output section having a plurality of pairs of output terminals, each of which has a maximum voltage and current rating. A switching network associated with the power output section connects and disconnects the plurality of pairs of output terminals to the external load. A control system connected to the switching network operates the switching network in response to changes in the impedance of the external load to connect and disconnect to the external load selected ones of the plurality of pairs of output terminals of the power output section to compensate for impedance variations in the external load and to prevent from being exceeded the maximum voltage and current ratings for each of the plurality of pairs of output terminals.

In another embodiment, the autoranging power supply apparatus may comprise a transformer having a primary winding with a plurality of taps and a secondary winding connected across the external load. A switching network associated with the primary winding of the transformer connects and disconnects the plurality of taps of the primary winding to an external power source. A control system connected to the switching network operates the switching network in response to changes in the impedance of the external load to connect and disconnect selected ones of the plurality of taps of the primary winding to the external power source to compensate for changes in the impedance of the external load.

In still another embodiment, the autoranging power supply may comprise a transformer having a primary winding and a secondary winding having a plurality of taps. A switching network connected to the secondary winding of the transformer connects and disconnects the plurality of taps of the secondary winding to the external load. A control system connected to the switching network operates the switching network in response to changes in the impedance of the external load to connect and disconnect selected ones of the plurality of taps of the secondary winding to the external load to compensate for changes in the impedance of the external load.

Also disclosed is a plasma processing system that comprises a process chamber having a first electrode and a second electrode. The process chamber is adapted to receive a process gas and to maintain the process gas within a predetermined pressure range. An autoranging power supply connected to the first and second electrodes in the process chamber may include a power output section having a plurality of pairs of output terminals, each of which has a maximum voltage and current rating. A switching network associated with the power output section connects and disconnects the plurality of pairs of output terminals to the first and second electrodes in the process chamber. A control system connected to the switching network operates the switching network in response to changes in the impedance of the process chamber to connect and disconnect to the first and second electrodes selected ones of the plurality of pairs of output terminals to compensate for impedance variations in the process chamber and to prevent from being exceeded the maximum voltage and current ratings for each of the plurality of pairs of output terminals.

A method for producing a plasma may comprise the steps of: providing a process chamber having a first electrode and a second electrode; connecting to the first and second electrodes an autoranging power supply that is operable in a first range of operation and a second range of operation; sensing an impedance of the plasma; and operating the autoranging power supply in the first range of operation if the impedance of the plasma is less than a predetermined impedance and operating the autoranging power supply in the second range of operation if the impedance of the plasma is greater than the predetermined impedance.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
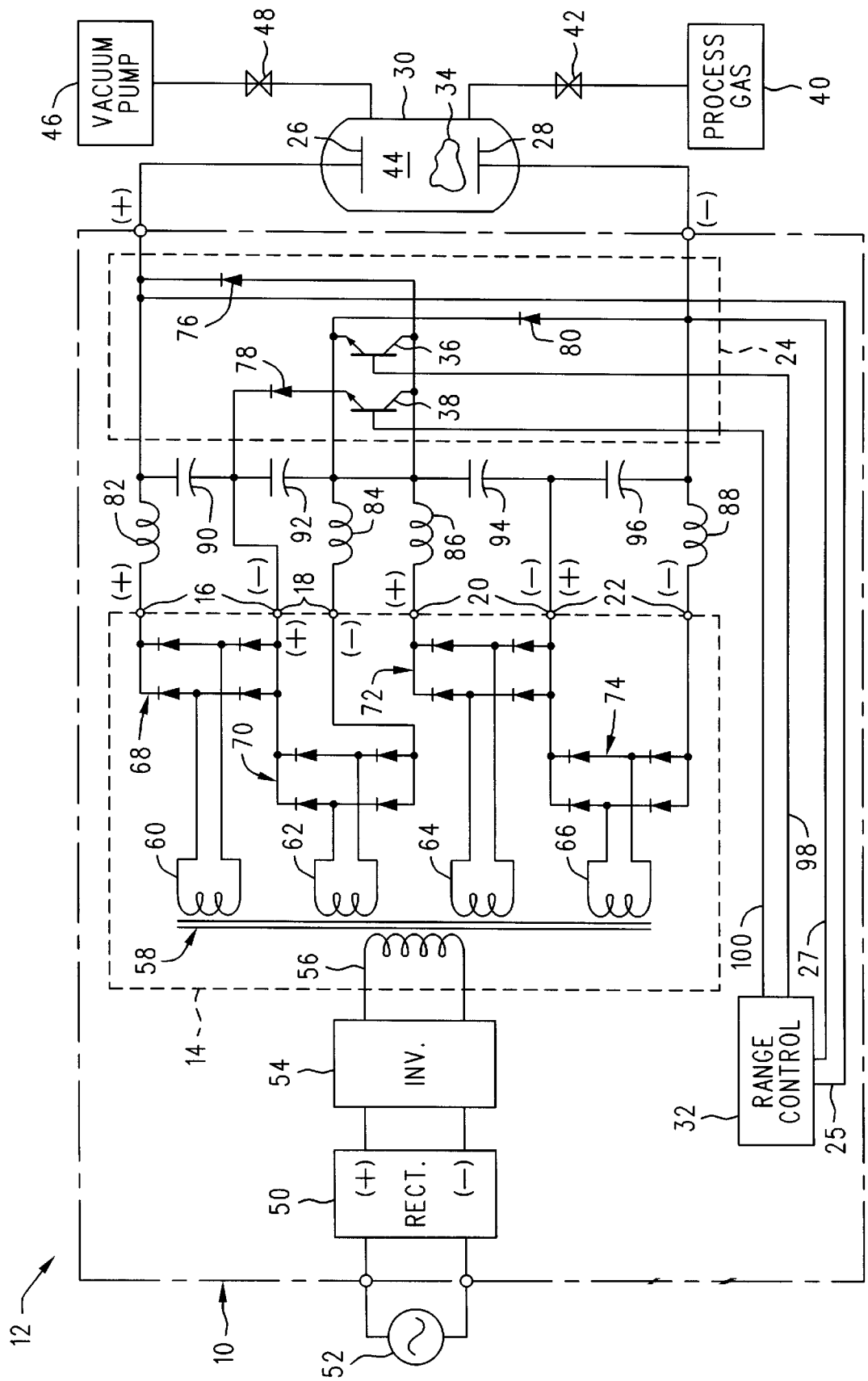
FIG. 1 is a schematic representation of one embodiment of an autoranging power supply as it could be used in a plasma processing system.

An autoranging power supply 10 according to one preferred embodiment of the present invention is shown in FIG. 1 as it could be utilized in a plasma processing system 12. The plasma processing system 12 may be used to perform any of a wide variety of plasma processes, such as sputter deposition, to deposit a thin film or coating (not shown) on the surface of a substrate (also not shown) contained within a process chamber 30. The autoranging power supply 10 provides power to the plasma processing system 12 and may include a power output section 14 having a plurality of pairs of output terminals 16, 18, 20, and 22. A switching network 24 connected to the power output section 14 selectively connects and disconnects the plurality of pairs of output terminals 16, 18, 20, and 22 to first and second electrodes 26 and 28 contained within the process chamber 30 (i.e., an external load). A range control circuit 32 is connected to the switching network 24 and operates the switching network 24 as required to connect and disconnect selected ones of the output terminal pairs 16, 18, 20 and 22 to the first and second electrodes 26 and 28.

The autoranging power supply 10 may be operated as follows to accomplish sputter deposition with the plasma processing system 12. When the autoranging power supply 10 is first turned on or activated, it produces a DC output voltage across the positive (+) and negative (−) output terminals of the power supply 10. The DC output voltage in turn appears across the first and second electrodes 26 and 28 and creates an electric field (not shown) between the first and second electrodes 26 and 28. The electric field ionizes a process gas (not shown) contained within the process chamber 30, resulting in the formation of a plasma 34. The plasma 34 may then be used to assist in performing a wide variety of plasma processes, e.g., sputter deposition.

In most plasma processing systems, the electrical impedance of the plasma is not constant and tends to vary with time due to a number of factors, such as the type of material being deposited, the pressure within the process chamber 30, the strength and orientation of the magnetic field used to confine the plasma (in magnetron sputtering) and other extrinsic factors. As regards magnetron sputtering processes, the impedance of the plasma tends to decrease as the target material erodes (i.e., as the target material is sputtered away). For example, in a magnetron sputter deposition process it is not uncommon for the impedance of the plasma to vary between about 80 ohms or so at the start of the process (i.e., with a new target) and decrease to about 20 ohms as the target nears the end of its useful life. Therefore, if the process is to be operated at a constant power of 8000 watts, the voltage across the first and second electrodes 26 and 28 at the start of the process will be about 800 volts and the current through the plasma will be about 10 amperes. As the target erodes and the impedance decreases to about 20 ohms, the voltage will decrease to about 400 volts, whereas the current will increase to about 20 amperes.

The range control circuit 32 senses changes in the impedance of the process chamber 30 (i.e., the impedance changes in the plasma 34) and actuates the switching network 24 as necessary to connect and disconnect selected ones of the output terminals 16, 18, 20, and 22 to the first and second electrodes 26, 28 to compensate for impedance variations in the plasma 34 and to prevent from being exceeded the maximum voltage and current ratings for each of the output terminal pairs 16, 18, 20, and 22, thereby protecting the power supply against overloads and possible burn-out. In one preferred embodiment, the range control circuit 32 is connected to the first and second electrodes 26 and 28 by a pair of wires 25 and 27 and senses the impedance changes in the plasma 34 by measuring the voltage across the first and second electrodes 26 and 28. Alternatively, other arrangements could be used, as will be described in greater detail below.

In the embodiment shown in FIG. 1, the switching network 24 comprises a pair of switching devices (e.g., transistors) 36 and 38 that are used to connect the output terminal pairs 16, 18, 20, and 22 in various series and parallel combinations. For example, when both transistors 36 and 38 are "off" or in the non-conducting state, the two "upper" output terminal pairs 16 and 18 are connected in series, as are the two "lower" output terminal pairs 20 and 22. The two series combinations of output terminal pairs (i.e., the upper output terminal pairs 16, 18 and the lower output terminal pairs 20, 22) are connected in parallel across the first and second electrodes 26 and 28. This parallel arrangement is a minimum voltage, maximum current configuration or range, which is typically desired when the electrical impedance of the chamber is lowest.

If transistor 38 is turned "on" i.e., switched to the conducting state, the two lower output terminal pairs 20 and 22 (which are still connected in series) are connected in series with output terminal pair 16. This second range is an intermediate range and provides an increased voltage to the plasma 34, but at slightly reduced maximum current level. The second range is generally preferred for intermediate plasma impedances.

A third output range is possible if transistor 36 is turned "on" i.e., switched to the conducting state. In this third range, output terminal pair 18 is connected in series with output terminal pairs 16, 20, and 22, and provides the highest voltage to the first and second electrodes 26 and 28. However, the maximum current rating of this third range is the lowest of the three ranges. This third range will usually be desired for higher plasma impedances.

In one preferred embodiment, the range control circuit 32 may switch between the various ranges when the impedance of the plasma reaches certain predetermined values. For example, if the impedance is between about 10 ohms and 25 ohms, the range control circuit 32 operates the autoranging power supply 10 in the first range. If the impedance of the plasma increases, so that it is in the range of about 24 ohms to 56 ohms, then the range control circuit 32 switches to operation in the second range. Then, if the impedance of the plasma increases still further, so that it is in the range of about 55 ohms to 100 ohms, then the range control circuit 32 will switch to operation in the third range. Alternatively, other methods could be used to control the selection of the various ranges. For example, the various ranges could be user selectable, and the user could manually select from among the various ranges.

With regard to the foregoing impedance ranges, it should be noted that the above-listed impedances are typical of a plasma processing system wherein the power delivered to the plasma is about 10 kilowatts. However, the impedance of the plasma in most plasma processing systems is dependent on the power delivered to the plasma, as well as other extrinsic factors. Consequently, the impedances set forth herein should be regarded as illustrative only and the present invention should not be regarded as limited to any particular range of plasma impedances.

A significant advantage of the autoranging power supply 10 according to the present invention is that it allows the power supply 10 to deliver maximum power to the plasma over a wide range of plasma impedances without the danger of overloading the power supply. The ability to deliver maximum (e.g., constant) power to the chamber (i.e., plasma 34) regardless of the impedance of the plasma greatly enhances the ability of the user to control the plasma processing system 12 to achieve improved performance and/or coating quality. The present invention achieves the foregoing advantages without the need to resort to power supplies having excess capacities and without the need to manually reconfigure transformer taps. Another significant advantage of the present invention is that the foregoing compensations for impedance changes are made "on the fly," thereby obviating the need to first deactivate the power supply. Consequently, the autoranging power supply according to the present invention will generally allow for increased processing capacity or throughput, since the plasma processing system need not be shut-down to reconfigure the power supply to compensate for impedance changes. The present invention is also capable of compensating for rapidly occurring impedance changes.

Having briefly described the autoranging power supply 10, as well as some of its more significant features and advantages, the preferred embodiments of the autoranging power supply and plasma processing system according to the present invention will now be described in detail. However, before proceeding with the description of the various embodiments, it should be noted that the circuits are shown and described herein in simplified form for clarity and ease of understanding the present invention. That is, the various embodiments of the autoranging power supply circuits do not include systems, circuits, and devices that are not directly related to the operation of the present invention. For example, most power supplies utilized in plasma deposition processes include one or more control systems and feedback loops to regulate the operation of the power supplies and to allow them to be operated in several different modes, such as constant power or constant current modes. The circuits shown and described herein for the various embodiments of the autoranging power supplies omit such feedback and control circuits since they are well-known in the art and could be easily provided by persons having ordinary skill in the art after having become familiar with the present invention.

Referring back now to FIG. 1, one embodiment 10 of the autoranging power supply according to the present invention is shown as it may be used with a plasma processing system 12 to accomplish a non-reactive DC sputter deposition process. Alternatively, however, the autoranging power supply 10 and plasma processing system 12 could be used to accomplish other types of plasma processes, such as sputter etching or reactive sputter deposition. Therefore, the present invention should not be regarded as limited to the non-reactive sputter deposition process shown and described herein.

The autoranging power supply 10 generates a DC output voltage or signal (not shown) which produces an electric field (also not shown) between the first and second electrodes 26 and 28 positioned within the process or vacuum chamber 30. The first electrode 26 is connected to the positive (+) output terminal of the power supply 10, thus serves as the anode, and may comprise any of a wide range of separate anode members. Alternatively, the anode or first electrode 26 may comprise the process chamber 30 itself. The second electrode 28 is connected to the negative (−) output terminal of the power supply 10, thus serves as the cathode. Accordingly, the second electrode 28 may comprise a cathode/target assembly (not shown) which contains the material (commonly referred to as the target) that is to be deposited on the surface of the object or substrate (also not shown). The cathode/target assembly utilized in one preferred embodiment of the present invention may comprise a planar magnetron cathode/target assembly of the type shown and described in U.S. Pat. No. 5,262,028, which is incorporated herein by reference for all that it discloses. Alternatively, other types of cathode/target assemblies, such as non-planar magnetrons or even regular (i.e., non-magnetron) diode sources could also be used. Therefore, the present invention should not be regarded as limited to any particular type of cathode/target assembly.

In accordance with its use to accomplish non-reactive sputter deposition processes, the process chamber 30 may include a process gas supply 40 which contains a supply of a suitable process gas (not shown), such as argon, although other gases could also be used. A process gas valve 42 connected between the process gas supply 40 and the process chamber 30 may be used to regulate the flow of process gas into the interior 44 of chamber 30. The process chamber 30 may also include a vacuum pump assembly 46 and a vacuum valve assembly 48 to maintain the interior 44 of the process chamber 30 within a range of pressures suitable for carrying out the desired process. For example, in most magnetron sputter deposition processes it is usually desirable to maintain the interior 44 of the process chamber 30 at a pressure of about 1 milliTorr (mTorr), although other pressures could also be used depending on the nature of the material being deposited and on other extrinsic factors.

It should be noted that process chambers (e.g., process chamber 30), as well as the various ancillary devices and systems (e.g., process gas supply systems, vacuum pumping systems, etc.) associated therewith, are well-known in the art and could be easily provided by persons having ordinary skill in the art after having become familiar with the present invention. Therefore, the particular process chamber 30 and related ancillary systems and devices utilized in one preferred embodiment of the invention will not be described in further detail.

If it is desired to configure the plasma processing system 12 to accomplish reactive sputter deposition, then the process chamber 30 may also be provided with a reactant gas source (not shown) that contains a supply of a suitable reactant gas. Examples of suitable reactant gases include, but are not limited to, oxygen ($O_2$), nitrogen ($N_2$), and hydrogen sulfide ($H_2S$). The reactant gas source (not shown) may also include a valve assembly (also not shown) to regulate the flow of the reactant gas into the interior 44 of process chamber 30. However, since such additional systems and devices required to accomplish reactive sputter deposition processes are also well-known in the art and could be easily provided by persons having ordinary skill in the art after having become familiar with the present invention, the additional systems and devices that may be required or desired to accomplish reactive sputter deposition also will not be described in further detail herein.

Still referring to FIG. 1, the autoranging power supply 10 comprises a power output section 14 that places a DC output voltage or signal (not shown) across the first and second electrodes 26 and 28. The power for the power output section 14 may be derived from a rectifier circuit 50 which converts alternating current (AC) produced by an alternating current source 52 to a direct current (DC) suitable for use by the switchmode inverter drive circuit 54. Alternatively, any convenient supply of direct current could also be used to power the switchmode inverter drive circuit 54.

In one preferred embodiment, the alternating current source 52 may a conventional 240 volt, 3 phase, 60 Hz alternating current supply. The rectifier circuit 50 may comprise a conventional 3-phase rectifier circuit to convert the 3-phase AC into DC. Alternatively, the alternating current source 52 may comprise a single phase supply in which case the rectifier circuit 50 would comprise a single phase rectifier circuit to convert the single phase alternating current into DC. In any event, since rectifier circuits for converting 3-phase or single phase alternating current into direct current are well known, the rectifier circuit 50 utilized in one preferred embodiment will not be described in further detail herein.

The switchmode inverter drive circuit 54 may comprise any of a wide range of drive circuits for converting the DC from rectifier 50 into an alternating current suitable for driving the primary winding 56 of transformer 58. Consequently, the autoranging power supply 10 should not be regarded as limited to any particular switchmode inverter drive circuit. By way of example, the switchmode inverter drive circuit 54 used in one preferred embodiment may comprise a phase-shift inverter drive circuit disclosed in U.S. patent application Ser. No. 08/966,489 entitled "Phase-Shift Power Supply," (Attorney Docket No. SASUS-9) filed currently herewith, which is incorporated herein by reference for all that it discloses.

The switchmode inverter drive circuit 54 may be operated over any of a wide range of switching frequencies consistent with the operation of transformer inverters. Generally speaking, higher switching frequencies are preferred since they allow a smaller transformer (e.g., transformer 58) and smaller filtering elements (e.g., inductors 82, 84, 86, and 88 and capacitors 90, 92, 94, and 96) to be used. In one preferred embodiment, the switchmode inverter drive circuit 54 operates at a switching frequency of about 100 kHz.

The power output section 14 of autoranging power supply circuit 10 comprises a plurality of pairs of output terminals 16, 18, 20, and 22, each of which has associated with it a maximum voltage and current rating (e.g., 250 volts and 15 amperes). As used herein the term "maximum voltage and current rating" refers to the maximum voltage and current that a given output terminal pair (e.g., 16, 18, 20 or 22) can deliver on a continuous basis without significant risk of damage to the circuit. The maximum voltage and current rating of a given output terminal pair may be exceeded from time to time on an intermittent or temporary basis without a serious risk of damage to the circuit.

The power output section 14 comprises a transformer 58 having a primary winding 56 and a plurality of secondary windings 60, 62, 64, and 66. The primary winding 56 is connected to the switchmode inverter drive circuit 54. Each secondary winding 60, 62, 64, and 66 is connected to a respective rectifier circuit 68, 70, 72, and 74. In one preferred embodiment, each rectifier circuit 68, 70, 72, and 74 comprises a conventional bridge rectifier circuit having four (4) diodes and converts an alternating current in each respective secondary winding 60, 62, 64, and 66, to a direct current which then appears across each respective output terminal pair 16, 18, 20, and 22 of power output section 14.

The transformer 58 and rectifier circuits 68, 70, 72, and 74 may comprise any of a wide range of devices, the values of which will depend on the particular application. Therefore, the autoranging power supply 10 should not be regarded as limited to any particular value or range of values for these components. By way of example, in one preferred embodiment, wherein the power supply 10 has an output capacity of 10,000 watts (in ranges of 500 volts at up to 30 amperes; 750 volts at up to 20 amperes; and 1000 volts at up to 13.5 amperes) with a conventional 240 volt, 3-phase 60 Hz input, the transformer 58 should comprise a primary winding 56 having 6 turns, with each secondary winding 60, 62, 64, and 66 comprising 7 turns. Each rectifier circuit 68, 70, 72, and 74 is rated at 1,000 volts and 30 amperes.

The switching network 24 is connected between each of the output terminal pairs 16, 18, 20, and 22 of power output section 14 and the positive (+) and negative (−) output terminals of the autoranging power supply circuit 10. The positive (+) and negative (−) output terminals are connected across the external load (i.e., to the first and second electrodes 26 and 28 in process chamber 30). As will be described in greater detail below, the switching network 24 connects and disconnects selected ones of the output terminal pairs 16, 18, 20, and 22 to the first and second electrodes 26 and 28 to compensate for changes in the electrical impedance of the plasma 34 and to prevent from being exceeded the maximum voltage and current rating associated with each output terminal pair 16, 18, 20, and 22.

In one preferred embodiment, the switching network 24 comprises a first transistor 36 connected between the positive (+) terminal of output terminal pair 20 and the negative (−) terminal of output terminal pair 18. A first diode 76 is connected between the positive (+) terminal of output terminal pair 20 and the positive (+) output terminal of autoranging power supply 10. A second transistor 38 and second diode 78 are connected in series between the positive (+) terminal of output terminal pair 20 and the negative (−) terminal of output terminal pair 16. The negative (−) terminal of output terminal pair 16 is common with the positive (+) terminal of output terminal pair 18, as shown in FIG. 1. A third diode 80 is connected in series between the negative (−) terminal of output terminal pair 18 and the negative (−) output terminal of autoranging power supply 10.

The types, values, and ratings for the first and second transistors 36 and 38 and the first, second, and third diodes 76, 78, and 80 will depend on the particular application, the capacity of the power supply, and other extrinsic factors. Consequently, the power supply 10 should not be regarded as limited to any particular types, values, or ratings for the transistors 36, 38 and diodes 76, 78, and 80. By way of example, in one preferred embodiment, each transistor 36, 38 may comprise an insulated gate bi-polar transistor (IGBT) rated at 600 volts and 30 amperes such as type IRGPC50S, available from International Rectifier Corporation of El Segundo, Calif. Alternatively, other types of switching devices, such as NPN or PNP transistors, field effect transistors (FETs), and metal oxide field effect transistors (MOSFETs), could also be used, as would be obvious to persons having ordinary skill in the art. Each diode 76, 78, and 80 may comprise a diode rated at 600 volts and 30 amps, such as type 1N1190, available from International Rectifier Corporation of El Segundo, Calif.

The autoranging power supply circuit 10 may also be provided with a variety of filtering elements (e.g., inductors and capacitors) to filter the DC produced by the various rectifier circuits 68, 70, 72, and 74, and to dampen various transients which may occur due to the operation of the switching network 24 or that may be induced by the plasma 34 contained within chamber 30. Specifically, a first inductor 82 is connected between the positive (+) terminal of the output terminal pair 16 and the positive (+) power output terminal of the power supply 10. A second inductor 84 is connected in series between the negative (−) terminal of the output terminal pair 18 and the emitter of the second transistor 36. A third inductor 86 is connected in series between the positive (+) terminal of the output terminal pair 20 and the collectors of the first and second transistors 36 and 38. Finally, a fourth inductor 88 is connected in series between the negative (−) terminal of the output terminal pair 22 and the negative (−) output terminal of the power supply 10.

The selection of the inductances of the inductors 82, 84, 86, and 88 will, of course, depend on the particular circuit in which they are used, the switching frequency of the switchmode inverter drive circuit 54, and on other extrinsic factors, some of which have already been mentioned. In one preferred embodiment, the first, second, third, and fourth inductors 82, 84, 86, and 88 all have inductances of about 0.2 millihenrys (mH), although other inductances may also be used.

The power supply circuit 10 may also include four capacitors connected across each of the output terminal pairs 16, 18, 20, and 22. That is, a first capacitor 90 is connected across the positive (+) and negative (−) terminals of the first output terminal pair 16 and a second capacitor 92 connected across the positive (+) and negative (−) terminals of the second output terminal pair 18. Third and fourth capacitors 94 and 96 are connected across the positive (+) and negative (−) terminals of third and fourth output terminal pairs 20 and 22, respectively.

As was the case for the other circuit elements already described, each capacitor 90, 92, 94, and 96 may comprise any of a wide range of values depending on the particular circuit, the switching frequency of the switchmode inverter drive circuit 54, and other extrinsic factors. In one preferred embodiment, each capacitor 90, 92, 94, and 96 has a value of about 1.0 microfarad ($\mu$F), although other values could also be used.

The range control circuit 32 is connected to the first and second transistors 36 and 38 and provides the appropriate base current to each transistor 36, 38 to switch each transistor 36, 38 between a conducting or "on" state and a non-conducting or "off" state. In one preferred embodiment, the range control circuit 32 is connected to the first and second electrodes 26 and 28 by a pair of wires 25 and 27. The range control circuit 32 detects the voltage across the first and second electrodes 26 and 28. If the power supply 10 is being operated in a constant current mode, then the impedance of the plasma 34 may be calculated based on the current delivered to the plasma 34 and the voltage potential across the first and second electrodes 26 and 28. After determining the impedance of the plasma 34, the range control circuit 32 produces a pair of switch control signals 98, 100 which provide the base current required to switch the respective first and second transistors 36 and 38 between the conducting and non-conducting states. Alternatively, the range control circuit 32 may determine the impedance of the plasma 34 by measuring the current flowing through the plasma 34, which may be desirable if the power supply 10 is not being operated in a constant current mode.

As was briefly discussed above, the autoranging power supply 10 may be used in conjunction with a plasma processing system 12 to perform any of a wide range of plasma processes (including, without limitation, non-reactive and reactive sputter deposition). In order to initiate the desired plasma process, a user (not shown) first turns-on or activates the autoranging power supply 10, at which time the switch mode inverter drive circuit 54 places an alternating current output signal (not shown) across primary winding 56 of transformer 58. The alternating current flowing in the primary winding 56 induces a corresponding alternating current in each of the secondary windings 60, 62, 64, and 66. The alternating current in each of the secondary windings 60, 62, 64, and 66 is rectified to DC by each respective rectifier circuit 68, 70, 72, and 74. In response to the switch control signals 98 and 100 produced by the range control circuit 32, the switching network 24 connects the output terminal pairs 16, 18, 20, and 22 of each respective rectifier circuit 68, 70, 72, and 74 in various series and parallel combinations to compensate for impedance variations in the plasma 34.

The first range that may be selected by the range control circuit 32 results in a minimum voltage, maximum current output across the positive (+) and negative (−) power output terminals of autoranging power supply circuit 10. This first range is generally advantageous for low plasma impedances. In order to operate the autoranging power supply 10 in this first range, the range control circuit turns off both transistors 36 and 38. That is, both transistors 36 and 38 are maintained in the non-conducting state. In this configuration, the upper two output terminal pairs 16 and 18 are connected in series, as are the lower two output terminal pairs 20 and 22. The two series combinations of output terminal pairs are connected in parallel across the first and second electrodes 26 and 28 through diodes 76 and 80. In one preferred embodiment where each output terminal pair is identically rated at about 250 volts and up to about 15 amperes, the first range produces a voltage across the first and second electrodes 26 and 28 of about 500 volts at a current up to about 30 amperes.

The second output range may be selected to provide to the positive (+) and negative (−) power output terminals a voltage of about 750 volts at a current up to about 20 amperes. The range control circuit 32 operates the autoranging power supply circuit 10 in this second output range by turning on (i.e., switching to the conducting state) the second transistor 38. When this occurs, both diodes 76 and 80 are reverse biased (i.e., essentially non-conducting) and the current path is through transistor 38, diode 78, and the first rectifier circuit 68. As was discussed above, this second output range is typically useful for intermediate plasma impedances.

The third range is selected when the range control circuit 32 turns on the first transistor 36. The autoranging power supply 10 operates in the third range regardless of whether the second transistor 38 is on or off (i.e., conducting or non-conducting). When the first transistor 36 is on, all three diodes 76, 78, and 80 are reversed biased and the current path is from the lower section (i.e., the series combination of output terminal pairs 20 and 22) through the first transistor 36 and upper section (i.e., the series combination of output terminal pairs 16 and 18). Put in other words, the output terminal pairs 16, 18, 20, and 22 are all connected in series. This combination or third range produces an output of about 1000 volts up to a maximum current of about 13.5 amperes. This high voltage, low current range is generally advantageous for high plasma impedances, such as those typically associated with new cathode/target assemblies.

As was briefly discussed above, the plasma utilized in most plasma deposition processes experiences variable impedances throughout the life of the target. In the example presented above (i.e., a 10 kilowatt power supply), the autoranging power supply 10 could provide the maximum rated power to the plasma processing system 12 even though the impedance of the plasma 34 varies over a range from about 10 ohms to about 100 ohms.

In one preferred embodiment, the range control circuit 32 may switch between the various ranges when the impedance of the plasma reaches certain predetermined values. For example, if the impedance is between about 10 ohms and 25 ohms, the range control circuit 32 operates the autoranging power supply 10 in the first range. If the impedance of the plasma increases, so that it is in the range of about 24 ohms to 56 ohms, then the range control circuit 32 switches to operation in the second range. If the impedance of the plasma increases still further, so that it is in the range of about 55 ohms to 100 ohms, then the range control circuit 32 will switch to operation in the third range. Alternatively, other methods could be used to control the selection of the various ranges. For example, the various ranges could be user selectable, and the user could manually select from among the various ranges.

As was mentioned above, the foregoing impedance ranges should be regarded as illustrative only, as the impedance of the plasma in a plasma processing system may vary depending on a wide range of factors, including the power delivered to the plasma. Accordingly, the present invention may be configured to switch from among the various ranges at impedances that are different from the impedances set forth above.

In the first embodiment 10 of the autoranging power supply, the compensation for impedance variations in the plasma 34 is accomplished by selecting various series and parallel combinations of the output terminal pairs 16, 18, 20, and 22 of the power output section 14. However, such compensation for impedance variations can also be accomplished by selecting from among various taps of the transformer used in the power supply circuit. For example, referring now to FIG. 2, a second embodiment 110 of an autoranging power supply may accomplish compensation for impedance variations by connecting and disconnecting various ones of several taps on a primary winding 156 of a transformer 158. By selecting from among the various taps, the range control circuit 132 changes the effective turns ratio of the transformer 158, thus the voltage and current appearing across the secondary winding 160. The AC appearing across the secondary winding 160 of transformer 158 is then rectified to DC by a rectifier circuit 168 and the DC voltage applied across first and second electrodes 126 and 128 contained within a process chamber 130. The applied DC voltage results in the production of a plasma 134 in the interior region 144 of process chamber 130.

As was the case for the first embodiment, the process chamber 130 utilized in the second embodiment 110 may include a process gas supply 140 and a process gas valve 142 for allowing into the interior 144 of process chamber 130 a metered quantity of a process gas, such as argon. A vacuum pump assembly 146 and valve assembly 148 maintain the interior 144 of process chamber 130 within a range of pressures suitable for carrying out the desired process. However, since such process chambers and ancillary systems and devices are well-known in the art, the process chamber 130 and ancillary systems and devices (e.g., process gas supply 140, vacuum pump assembly 146, etc.) will not be described in further detail.

The power for the autoranging power supply 110 may be derived from a rectifier circuit 150 which converts alternating current (AC) produced by an alternating current source 152 to a direct current (DC) suitable for use by the inverter circuit 115. Alternatively, any convenient supply of direct current could also be used. In the embodiment shown in FIG. 2, the alternating current source 152 may a conventional 240 volt, 3 phase, 60 Hz alternating current supply. The rectifier circuit 150 then converts or rectifies the 3-phase AC into DC. Of course, the alternating current source 152 may comprise a single phase supply, in which case the rectifier circuit 150 would convert the single phase alternating current into DC. In any event, since rectifier circuits for converting 3-phase or single phase alternating current into direct current are well known, the rectifier circuit 150 utilized in one preferred embodiment will not be described in further detail herein.

The inverter circuit 115 converts the direct current produced by the rectifier circuit 150 to an alternating current which is then rectified back to DC by rectifier circuit 168. The inverter circuit 115 may comprise a transformer 158 having a primary winding 156 and a secondary winding 160. The primary winding 156 includes a pair of end tap leads 161, 163 and a center tap lead 165. A first intermediate tap lead 167 is connected to the primary winding 156 between the first end tap lead 161 and the center tap lead 165. Similarly, a second intermediate tap lead 169 is connected to the primary winding 156 between the center tap lead 165 and the second end tap lead 163. Primary tap leads 161, 163, 167, and 169 may be connected to the ground return path through respective switching devices 131, 133, 137, and 139. A first diode 171 is connected in series between end tap lead 161 and switching device 131, while a second diode 173 is connected in series between tap lead 163 and switching device 133. Similarly, third and fourth diodes 177 and 179 are connected in series between tap leads 167 and 169 and switching devices 137 and 139.

A pulse generator 153 is connected to the range control circuit 132 and to each of the switching devices 131, 133, 137, and 139. Pulse generator 153 is responsive to a range control signal 198 produced by the range control circuit 132. Pulse generator 153 may also be responsive to a feedback signal (not shown) derived from a feedback circuit (also not shown) to allow control over the voltage and/or current of the DC output signal produced by the power supply 110. However, since such feedback circuits are well-known and could be easily provided by persons having ordinary skill in the art, the particular feedback circuit utilized in one preferred embodiment will not be described further.

In accordance with the range control signal 198 and feedback signal (not shown) the pulse generator 153 varies the switch control signals 141, 143, 147, and 149 as necessary to switch selected ones of the switching devices 131, 133, 137, and 139 between the conducting and non-conducting states to accomplish compensation for impedance variations, as will be described in greater detail below, and to regulate the current and/or voltage output of the inverter circuit 115.

The secondary winding 160 of transformer 158 is connected to a rectifier circuit 168 which, in one preferred embodiment, comprises a conventional full wave diode bridge network. Alternatively, other types of rectifier circuits could also be used, although full wave rectifiers are preferred. A first inductor 182 and first capacitor 190 are connected in series across the DC side of the rectifier circuit 168. The positive (+) terminal of the autoranging power supply circuit 110 is connected between the inductor 182 and capacitor 190. The negative (−) terminal is connected to the other side of capacitor 190 in the manner shown in FIG. 2.

As was the case for the first embodiment, the various components comprising the autoranging power supply 110 may comprise a variety of different values depending on the capacity of the power supply, the particular process that is to be performed, and other extrinsic factors. Consequently, the second embodiment 110 of the autoranging power supply should not be regarded as limited to components having any particular values or ranges of values. By way of example, the transformer 158 used in one embodiment may have a primary winding 156 comprising 18 turns, with taps 165, 167, and 169 located at 14, 9, and 4 turns, respectively, from the first end tap lead 161. The secondary winding 158 may comprise 20 turns. Diodes 171, 173, 177, and 179 may comprise diodes rated at 1,000 volts and 30 amperes, such as type APT30D100, available from Advanced Power Technology, Inc., of Bend, Oreg. The rectifier assembly 168 may comprise a full wave diode bridge rated at 1,000 volts and 60 amperes. The inductor 182 may have an inductance of 0.4 millihenrys (mH) and the capacitor 190, a capacitance of 10 microfarads ($\mu$F).

The switching devices 131 and 133 may comprise MOSFETs rated at 1,000 volts and 20 amperes, such as type APT10053LNR, available from Advanced Power Technology, Inc., of Bend, Oreg. Switching devices 137 and 139 may comprise MOSFETs rated at 500 volts and 77 amperes, such as type APT50M50, which are also available from Advanced Power Technology, Inc. Alternatively, other types of switching devices, such as bi-polar transistors, insulated gate bi-polar transistors, or FETs may also be used.

As was mentioned above, each of the switching devices 131, 133, 137, and 139 is switched between the conducting and non-conducting states by a pulse generator 153. Pulse generator 153 is also connected to the range control circuit 132 and is responsive to a range control signal 198 generated thereby. The pulse generator 153 then switches selected combinations of the switching devices 131, 133, 137, and 139 between the conducting and non-conducting states as necessary to achieve at the positive (+) and negative (−) output terminals of the power supply 110 an output signal having a voltage and current rating commensurate with the impedance of the plasma 134.

More specifically, the pulse generator 153 produces a plurality of control signals 141, 143, 147, and 149 which control the respective switching devices 131, 133, 137, and 139. In one preferred embodiment, each control signal 141, 143, 147, and 149 comprises a pulse width modulated (PWM) signal (e.g., 111) wherein the length (e.g., arrow 113) of the pulse width is variable, with longer pulse widths corresponding to longer "on" times for each respective switching device and vice-versa. By controlling the "on" time of each switching device, the pulse generator circuit 153 may also be used to regulate the current or power in the plasma 134. The widths of the various pulses may be selected based on the feedback signal (not shown) produced by the feedback circuit (also not shown).

The pulse generator 153 may comprise any of a wide variety of pulse generator circuits that produce a plurality of square wave pulses or PWM pulses suitable for controlling the particular switching devices used to control the current flowing in the primary winding 156 of transformer 158. By way of example, in one preferred embodiment, the pulse generator 153 comprises a model no. UC3825 pulse generator available from Unitrode Integrated Circuits Corporation of Merrimack, NH. Alternatively, other types of pulse generators may also be used.

A first range which will produce across the positive (+) and negative (−) output terminals a DC output signal having a minimum voltage and maximum current rating can be achieved by actuating switching devices 131 and 133 in an alternating manner while switching devices 137 and 139 are maintained in the non-conducting state. When switching device 131 is conducting, current will flow from the center tap 165, through primary winding 156, diode 171, and switching device 131. The current then returns to the rectifier assembly 150 via the ground path. The pulse generator then turns off switching device 131 and turns on switching device 133, which causes the current to flow from the center tap 165, through primary winding 156, diode 173, and switching device 133. The alternating current flowing in the primary winding 156 induces an alternating current in the secondary winding 160, which is then rectified and provided to the first and second electrodes 126 and 128.

A second range may be selected to provide an increased voltage, but at a reduced maximum current at the positive (+) and negative (−) output terminals of the circuit 110. The second range may be selected by alternately switching between the conducting and non-conducting states switching devices 137 and 139 and leaving in the non-conducting states switching devices 131 and 133. This arrangement reduces the effective number of turns of the primary winding 156, thereby resulting in an increased voltage across the secondary winding 160 compared to the case when only the switching devices 131 and 133 are actuated. The pulse generator 153 switches the switching devices 137 and 139 in an alternating manner to cause an alternating current to flow in primary winding 156. When switching device 137 is placed in the conducting state, current flows from center tap lead 165 through primary winding 156, and diode 177. The current flow then returns to the rectifier circuit 150 via switching device 137. When switch 139 is placed in the conducting state, current flows from the center tap lead 165 through primary winding 156 and diode 179 and returns to the rectifier circuit 150 via switching device 139.

As was the case for the first embodiment 10, the range control circuit 132 may be connected to the first and second electrodes 126 and 128 by a pair of wires 125 and 127. The range control circuit 132 may sense the voltage potential across the two electrodes 126 and 128 to determine the impedance of the plasma 134. The range control circuit 132 may switch between the two ranges when the impedance of the plasma reaches a certain predetermined value. For example, if the impedance of the plasma 134 is less than about 50 ohms, then the range control circuit 132 operates the power supply 110 in the first range. If the impedance is equal to or greater than 100 ohms, the range control circuit 132 switches to operation in the second range. Alternatively, other methods could be used to control the selection of the various ranges. For example, the various ranges could be user selectable, and the user could manually select from among the various ranges.

Alternatively, the range control circuit 132 could be used to sense the current flowing through the plasma 134, as was described for the first embodiment of the range control circuit 32. Such a configuration may be desirable if the power supply 110 is not operated in a constant current mode.

Figure 2:
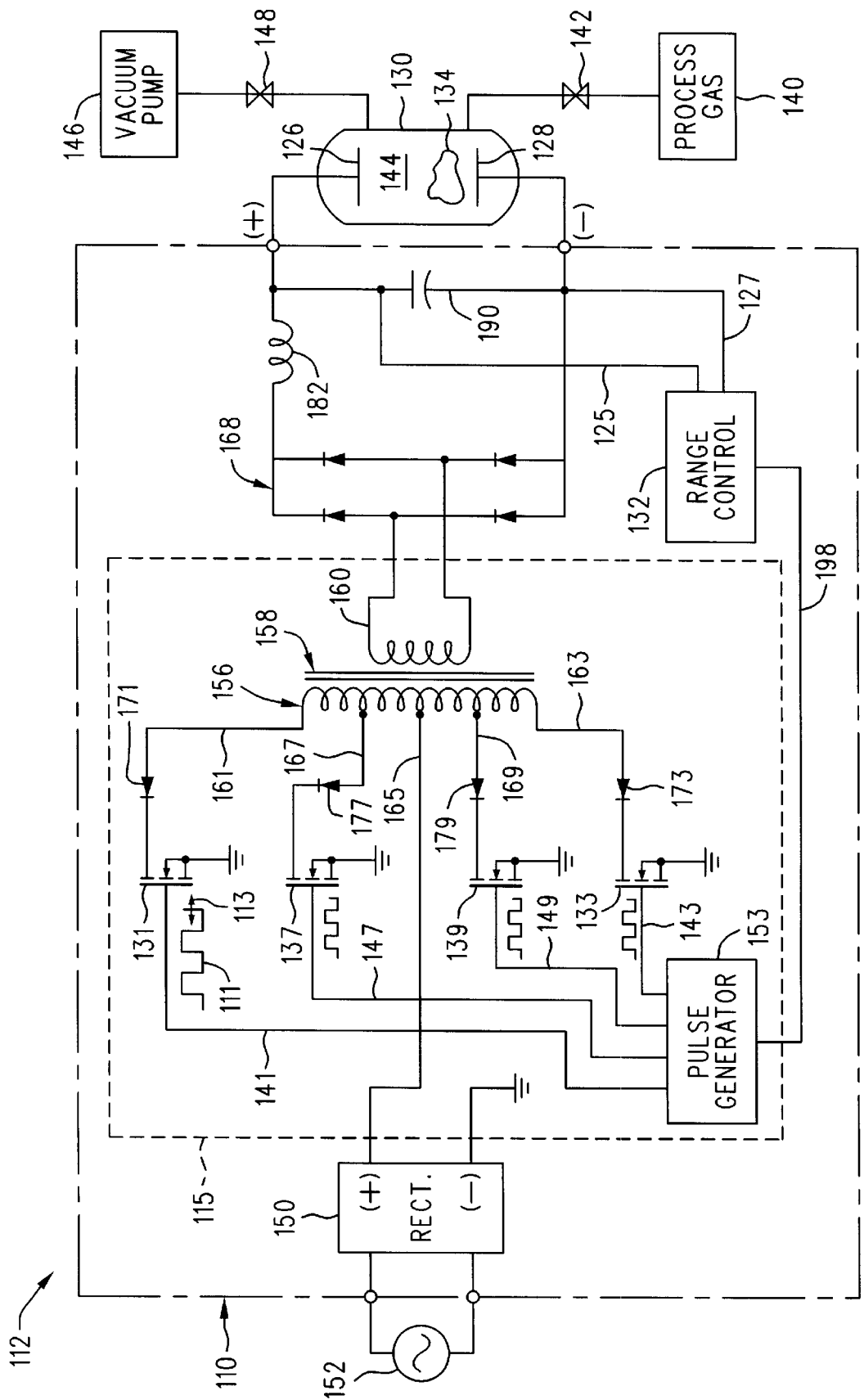
FIG. 2 is a schematic representation of a second embodiment of an autoranging power supply.

Finally, while the second embodiment 110 of the autoranging power supply shown in FIG. 2 may be switched between two ranges, additional ranges could be provided by supplying the primary winding 156 with additional taps and switching devices.

Figure 3:
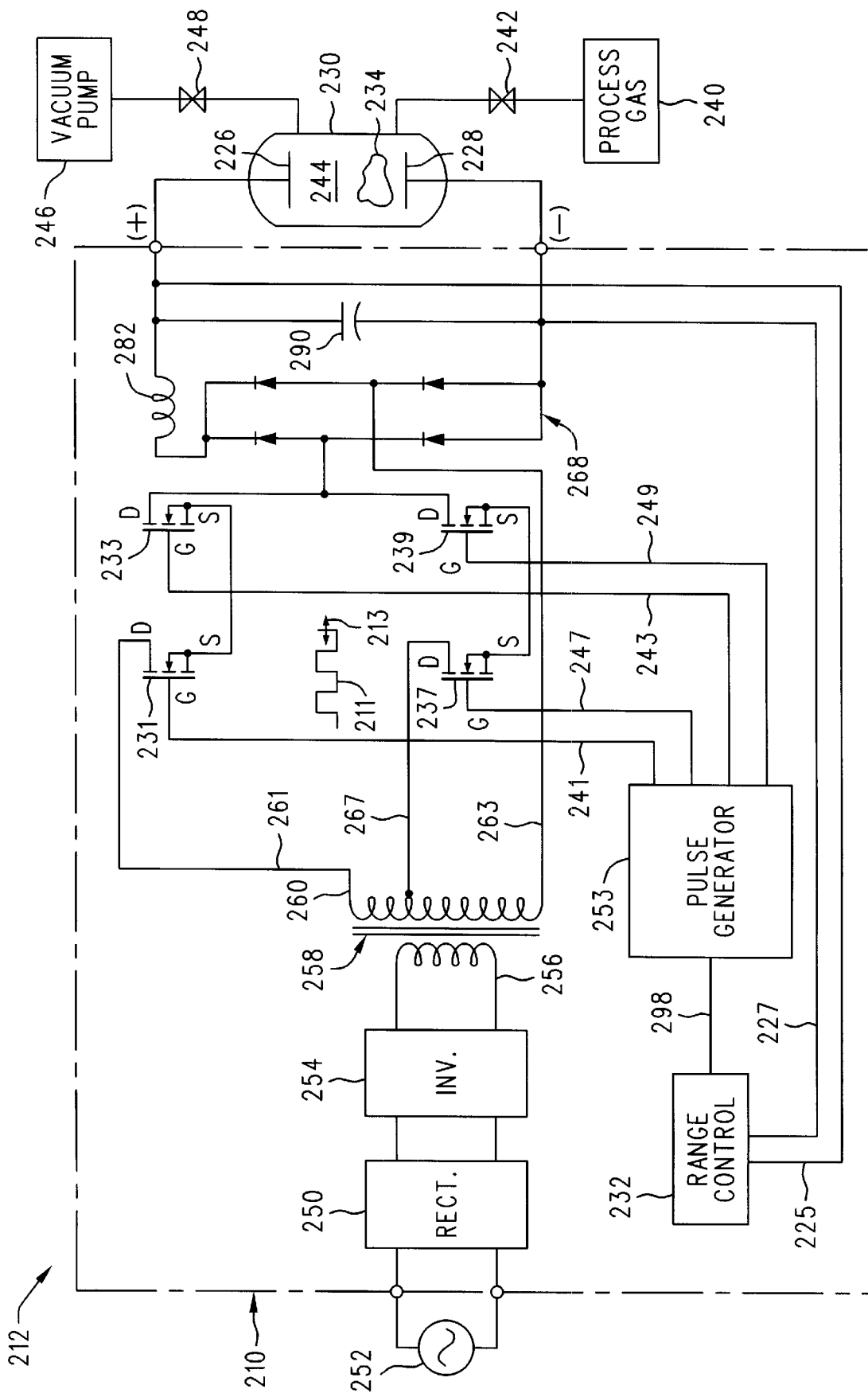
FIG. 3 is a schematic representation of a third embodiment of an autoranging power supply.

A third embodiment 210 of an autoranging power supply according to the present invention is shown in FIG. 3. This third embodiment 210 utilizes a plurality of switching devices 231, 233, 237, and 239 to connect various taps of the secondary winding 260 of transformer 258 to the first and second electrodes 226 and 228 contained within vacuum chamber 230. The DC voltage provided by the power supply 210 results in the creation of a plasma 234 in the interior region 244 of the process chamber 230. By selecting from among the various taps on the secondary winding 260, the autoranging power supply 210 may provide to the first and second electrodes 226 and 228 a DC output signal having voltage and current capacities suitable for the impedance of the plasma 234.

As was the case for the first embodiment, the process chamber 230 utilized in the third embodiment 210 may include a process gas supply 240 and a process gas valve 242 for allowing into the interior 244 of process chamber 230 a metered quantity of a process gas, such as argon. A vacuum pump assembly 246 and valve assembly 248 maintain the interior 244 of process chamber 230 within a range of pressures suitable for carrying out the desired process. However, since such process chambers and ancillary systems and devices are well-known in the art, the process chamber 230 and ancillary systems and devices (e.g., process gas supply 240, vacuum pump assembly 246, etc.) will not be described in further detail.

The power for the autoranging power supply 210 may be derived from a rectifier circuit 250 which converts alternating current (AC) produced by an alternating current source 252 to a direct current (DC) suitable for use by the switch mode inverter drive circuit 254. Alternatively, any convenient supply of direct current could also be used. In the embodiment shown in FIG. 3, the alternating current source 252 may a conventional 240 volt, 3 phase, 60 Hz alternating current supply. The rectifier circuit 250 then converts or rectifies the 3-phase AC into DC. Of course, the alternating current source 252 may comprise a single phase supply in which case the rectifier circuit 250 would convert the single phase alternating current into DC. In any event, since rectifier circuits for converting 3-phase or single phase alternating current into direct current are well known, the rectifier circuit 250 utilized in one preferred embodiment will not be described in further detail herein.

The switch mode inverter drive circuit 254 may comprise any of a wide range of drive circuits suitable for converting the DC from rectifier 250 into an alternating current suitable for driving the primary winding 256 of transformer 258. Consequently, the third embodiment 210 of the autoranging power supply should not be regarded as limited to any particular switchmode inverter drive circuit. By way of example, the switchmode inverter drive circuit 254 used in one preferred embodiment may comprise the inverter drive circuit disclosed in U.S. patent application Ser. No. 08/966,489, (Attorney Docket No. SASUS-9) entitled "Phase-Shift Power Supply," filed currently herewith, referred to above and which is already incorporated herein by reference for all that it discloses.

The switchmode inverter drive circuit 254 may be operated over any of a wide range of switching frequencies consistent with the operation of transformer inverters. Generally speaking, higher switching frequencies are preferred since they allow a smaller transformer (e.g., transformer 258) and smaller filtering elements (e.g., inductor 282 and capacitor 290) to be used. In one preferred embodiment, the switchmode inverter drive circuit 254 operates at a switching frequency of about 25 kHz.

The transformer 258 may comprise a primary winding 256 and a secondary winding 260. The primary winding 256 is connected to the switchmode inverter drive circuit 254 and generates an alternating magnetic field (not shown) which induces a current in the secondary winding 260. The secondary winding 260 includes a first end tap lead 261 and a second end tap lead 263. An intermediate tap lead 267 is connected to the secondary winding 260 at a position intermediate the first and second end tap leads 261, 263. Note that intermediate tap lead 267 can be electrically connected to any point on the secondary winding 260 and need not be located at the center point. That is, intermediate tap lead 267 need not comprise a "center tap." The selection of the point of connection of the intermediate tap lead 267 will depend on the particular voltage and current range that is to be accommodated, as will be described in greater detail below.

The first end tap lead 261 is connected to a pair of switching devices 231 and 233. More specifically, the first end tap lead 261 is connected to the drain D of switching device 231 which may comprise an N-type MOSFET. The source S of switching device 231 is connected to the source S of the second switching device 233 which may also comprise an N-type MOSFET. The drain D of the second switching device 233 is connected to the rectifier circuit 268. The gates G of each switching device 231, 233 are connected to the pulse generator 253. The second end tap lead 263 of secondary winding 260 is connected to the rectifier circuit 268, as shown in FIG. 3.

The intermediate tap lead 267 is connected to a second pair of switching devices 237 and 239. Specifically, the intermediate tap lead 267 is connected to the drain D of switching device 237 which may comprise an N-type MOSFET. The source S of switching device 237 is connected to the source S of the switching device 239. Switching device 239 may also comprise an N-type MOSFET. The drain D of switching device 239 is connected to the drain D of switching device 233. The gates G of each switching device 237 and 239 are also connected to the pulse generator 253.

The rectifier circuit 268 utilized in the embodiment shown in FIG. 3 comprises a conventional full wave diode bridge network. Alternatively, other types of rectifier circuits could also be used, although full wave rectifiers are preferred. A first inductor 282 and first capacitor 290 are connected in series across the DC side of the rectifier circuit 268. The positive (+) terminal of the autoranging power supply circuit 210 is connected between the inductor 282 and capacitor 290. The negative (−) terminal is connected to the other side of capacitor 290 in the manner shown in FIG. 3.

As was the case for the first two embodiments, the various components comprising the third embodiment 210 of the autoranging power supply may comprise a variety of different values depending on the capacity of the power supply, the particular process that is to be performed, and other extrinsic factors. Consequently, the third embodiment 210 of the autoranging power supply should not be regarded as limited to components having any particular values or ranges of values. By way of example, the transformer 258 used in one embodiment may have a primary winding 256 comprising 20 turns. The secondary winding 260 may comprise 30 turns, with the intermediate tap 267 located at 25 turns from first end tap lead 261. The rectifier assembly 268 may comprise a full wave diode bridge rated at 1200 volts and 30 amperes. The inductor 282 may have an inductance of 0.6 millihenrys (mH) and the capacitor 290, a capacitance of 20 microfarads ($\mu$F).

The switching devices 231, 233, 237, and 239 utilized in the embodiment shown in FIG. 3 may all comprise N-type MOSFETs rated at 1,000 volts and 20 amperes, such as type APT10053LNR which are available from Advanced Power Technology, Inc., of Bend, Oreg. Alternatively, other types of switching devices, such as bi-polar transistors, insulated gate bi-polar transistors, and FETs could also be used, with appropriate diodes connected in parallel across the devices to perform the function of the internal body diode associated with MOSFETs.

As was mentioned above, each of the switching devices 231, 233, 237, and 239 is switched between the conducting and non-conducting states by a pulse generator 253. Pulse generator 253 is also connected to the range control circuit 232 and is responsive to a range control signal 298 generated thereby. The range control circuit 232 may be connected across the first and second electrodes 226 and 228 by a pair of wires 225 and 227 and the range control circuit 232 may determine the impedance of the plasma 234 based on the voltage across the electrodes 226 and 228. Alternatively, the range control circuit 232 may also sense the current in the plasma 234 if the power supply 210 is not operated in a constant current mode.

The pulse generator 253 may also be responsive to a feedback signal (not shown) produced by a suitable feedback circuit (also not shown) to provide regulation of the voltage and current output of the circuit, although it is not required. However, since such feedback control systems are well-known, the feedback control system will not be described in further detail. The pulse generator 253 switches selected combinations of the switching devices (switching devices 231 and 233 are controlled together, as are switching devices 237 and 239) between the conducting and non-conducting states as necessary to achieve at the positive (+) and negative (−) output terminals of the power supply 210 an output signal having a voltage and current rating commensurate with the impedance of the plasma 234.

More specifically, the pulse generator 253 produces a plurality of control signals 241, 243, 247, and 249 which control the respective switching devices 231, 233, 237, and 239. For example, when switching devices 231 and 233 are placed in the conducting or closed states (devices 237 and 239 are non-conducting or open) then the entire secondary winding 260 is connected to the diode bridge circuit 268. This configuration is the high voltage range. Conversely, when switching devices 237 and 239 are placed in the conducting or closed states (and devices 231 and 233 are placed in the open or non-conducting states), then the center tap lead 267 and end tap lead 263 are connected to the diode bridge circuit 268. This configuration is the low voltage range.

In an alternative arrangement, each control signal 241, 243, 247, and 249 may comprise a pulse width modulated (PWM) signal (e.g., 211) wherein the length (e.g., arrow 213) of the pulse width is variable, with longer pulse widths corresponding to longer "on" times for each respective switching device and vice-versa. By controlling the "on" time of each switching device, in response to the feedback signal (not shown), the pulse generator circuit 253 may also be used to regulate the current or power in the plasma 234. In such an application, the pulse generator 253 may comprise any of a wide variety of pulse generator circuits that produce a plurality of square wave pulses or PWM pulses suitable for controlling the particular switching devices used to control the current flowing in the secondary winding 260 of transformer 258. By way of example, in one preferred embodiment, the pulse generator 253 comprises a model no. UC3825 pulse generator available from Unitrode Integrated Circuits Corporation of Merrimack, N.H. Alternatively, other types of pulse generators may also be used.

A first range which will produce across the positive (+) and negative (−) output terminals a DC output signal having a minimum voltage and maximum current rating can be achieved by turning on switching devices 237 and 239 while switching devices 231 and 233 are maintained in the non-conducting state. When switching devices 237 and 239 are "on" i.e., conducting, current will flow through the second end lead 263, secondary winding 260, and intermediate tap lead 267. The alternating current flowing in the secondary winding 260 is then rectified by rectifier circuit 268 and provided to the first and second electrodes 226 and 228 contained within process chamber 230.

A second range may be selected to provide an increased voltage, but at a reduced maximum current at the positive (+) and negative (−) output terminals of the circuit 110. The second range may be selected by turning on switching devices 231 and 233 and leaving in the non-conducting states switching devices 237 and 239. This arrangement increases the effective number of turns of the secondary winding 260, thereby resulting in an increased voltage across the secondary winding 260 compared to the case when only the switching devices 237 and 239 are turned on (i.e., placed in the conducting state). When switching devices 231 and 233 are placed in the conducting states, current flows through the first and second end leads 261 and 263 of secondary winding 260.

The range control circuit 232 may switch between the two ranges when the impedance of the plasma reaches a certain predetermined value. For example, if the impedance of the plasma 234 is less than about 75 ohms, then the range control circuit 232 operates the power supply 210 in the first range. If the impedance is equal to or greater than 74 ohms, the range control circuit 232 switches to operation in the second range. Alternatively, other methods could be used to control the selection of the various ranges. For example, the various ranges could be user selectable, and the user could manually select from among the various ranges. Also, as was noted for the first two embodiments, the impedance of the plasma 234 may vary depending on a number of factors, including the power delivered to the plasma 234. Consequently, the present invention should not be regarded as limited to switching from among the various ranges at any particular impedance value.

Finally, while the third embodiment 210 of the autoranging power supply shown in FIG. 3 may be switched between two ranges, additional ranges could be provided by supplying the secondary winding 260 with additional taps and switching devices.

It is contemplated that the inventive concepts herein described may be variously otherwise embodied and it is intended that the appended claims be construed to include alternative embodiments of the invention except insofar as limited by the prior art.

What is claimed is:

1. An autoranging power supply for supplying power to an external load, the external load having a variable impedance, comprising:

a power output section having a plurality of pairs of output terminals, each of the plurality of pairs of output terminals having preselected maximum voltage and current ratings;

switching means associated with said power output section of said autoranging power supply for connecting and disconnecting the plurality of pairs of output terminals to the external load; and control means connected to said switching means for operating said switching means, said control means also being operatively associated with the external load and responsive to changes in the impedance of the external load, wherein said control means operates said switching means so that said switching means connects and disconnects selected ones of the plurality of pairs of output terminals of said power output section to the external load to compensate for impedance variations in the external load and to prevent from being exceeded the maximum voltage and current ratings for each of said plurality of pairs of output terminals.

2. The autoranging power supply of claim 1, wherein said power output section comprises:

a transformer having a primary winding and a plurality of secondary windings, the primary winding being connected to a supply of alternating current;

a plurality of rectifiers connected to each of said plurality of secondary windings, each of said plurality of rectifiers converting an alternating current in each of said plurality of secondary windings to a direct current, each of said plurality of rectifiers having a positive output terminal and a negative output terminal, the positive and negative output terminals of each of said plurality of rectifiers corresponding to each of the plurality of pairs of output terminals of said power output section.

3. The autoranging power supply of claim 2, wherein the supply of alternating current comprises a switchmode inverter drive circuit.

4. The autoranging power supply of claim 1, wherein said control means operates said switching means so that the plurality of pairs output terminals of said power output section are connected to the external load in various series and parallel combinations to compensate for impedance variations in the external load and to prevent from being exceeded the maximum voltage and current ratings for each of said plurality of pairs of output terminals.

5. A plasma processing system, comprising:

a process chamber having a first electrode and a second electrode, said process chamber being adapted to receive a process gas and to maintain the process gas within a predetermined pressure range, the process chamber having a variable impedance;

an autoranging power supply connected to the first and second electrodes in said process chamber, said autoranging power supply including:

a power output section having a first pair of output terminals and a second pair of output terminals, the first and second pairs of output terminals having preselected maximum voltage and current ratings;

switching means associated with said power output section for connecting and disconnecting the first and second pairs of output terminals to the first and second electrodes in said process chamber; and control means connected to said switching means for operating said switching means, said control means also being operatively associated with the first and second electrodes in said process chamber and responsive to changes in the impedance of said process chamber, wherein said control means operates said switching means so that said switching means connects and disconnects selected ones of the first and second pairs of the output terminals of said power output section to the first and second electrodes in said process chamber to compensate for changes in the impedance of said process chamber.

6. The plasma processing system of claim 5, wherein said control means operates said switching means so that the first and second pairs of output terminals of said power output section are connected to the first and second electrodes in various series and parallel combinations to compensate for impedance variations in said process chamber and to prevent from being exceeded the maximum voltage and current ratings for each of the first and second pairs of output terminals.

7. The plasma processing system of claim 5, wherein said power output section comprises:

a transformer having a primary winding and a plurality of secondary windings, the primary winding being connected to a supply of alternating current; and a plurality of rectifiers connected to each of said plurality of secondary windings, each of said plurality of rectifiers converting an alternating current in each of said plurality of secondary windings to a direct current, each of said plurality of rectifiers having a positive output terminal and a negative output terminal, the positive and negative output terminals of each of said plurality of rectifiers corresponding to each of the first and second pairs of output terminals of said power output section.

8. The plasma processing system of claim 7, wherein the plurality of secondary windings of said transformer comprise first, second, third, and fourth secondary windings and wherein the plurality of rectifiers comprise first, second, third, and fourth rectifiers connected to the respective first, second, third, and fourth secondary windings.

9. The plasma processing system of claim 8, wherein the positive output terminal of said second rectifier is connected to the negative output terminal of said first rectifier and wherein the positive output terminal of said fourth rectifier is connected to the negative output terminal of said third rectifier, the positive output terminal of said first rectifier being connected to the first electrode in said process chamber, and the negative output terminal of said fourth rectifier being connected to the second electrode in said process chamber.

10. A plasma processing system comprising:
a process chamber having a first electrode and a second electrode, said process chamber being adapted to receive a process gas and to maintain the process gas within a predetermined pressure range, the process chamber having a variable impedance;
a transformer having a primary winding and first, second, third, and fourth secondary windings, the primary winding being connected to a supply of alternating current;
a first rectifier connected across the first secondary winding of said transformer, said first rectifier having a positive output terminal and a negative output terminal, the positive output terminal of said first rectifier being connected to the first electrode in said process chamber;
a second rectifier connected across the second secondary winding of said transformer, said second rectifier having a positive output terminal and a negative output terminal, the positive output terminal of said second rectifier being connected to the negative output terminal of said first rectifier;
a third rectifier connected across the third secondary winding of said transformer, said third rectifier having a positive output terminal and a negative output terminal;
a fourth rectifier connected across the fourth secondary winding of said transformer, said fourth rectifier having a positive output terminal and a negative output terminal, the positive output terminal of said fourth rectifier being connected to the negative output terminal of said third rectifier, the negative output terminal of said fourth rectifier being connected to the second electrode in said process chamber;
a first diode connected between the positive output terminal of said third rectifier and the first electrode in said process chamber;
a first transistor connected between the negative output terminal of said second rectifier and the positive output terminal of said third rectifier;
a second transistor and a second diode connected in series between the negative output terminal of said first rectifier and the positive output terminal of said third rectifier;
a third diode connected between the negative output terminal of said second rectifier and the second electrode in said process chamber; and control means connected to said first and second transistors for switching said first and second transistors between conducting and non-conducting states, said control means also being operatively associated with the first and second electrodes in said process chamber and responsive to changes in the impedance of said process chamber, wherein said control means switches said first and second transistors between the conducting and non-conducting states to connect said first, second, third, and fourth rectifiers in various serial and parallel combinations to the first and second electrodes in said process chamber to compensate for changes in the impedance of said process chamber.

11. The plasma processing system of claim 10, further comprising:
a first inductor connected in series between the positive output terminal of said first rectifier and the first electrode in said process chamber;
a second inductor connected in series between the negative output terminal of said second rectifier and said first transistor;
a third inductor connected in series between the positive output terminal of said third rectifier and said first transistor; and
a fourth inductor connected in series between the negative output terminal of said fourth rectifier and the second electrode in said process chamber.

12. The plasma processing system of claim 11, further comprising:
a first capacitor connected in series between the negative output terminal of said first rectifier and the first electrode in said process chamber;
a second capacitor connected in series between said first transistor and the negative output terminal of said first rectifier;
a third capacitor connected in series between the negative output terminal of said third rectifier and the first transistor; and
a fourth capacitor connected in series between the positive output terminal of said fourth rectifier and the second electrode in said process chamber.

13. The plasma processing system of claim 12, wherein the supply of alternating current comprises a switchmode inverter drive circuit.

14. A plasma processing system, comprising:
a process chamber having a first electrode and a second electrode, said process chamber being adapted to receive a process gas and to maintain the process gas within a predetermined pressure range, the process chamber having a variable impedance;
a transformer having a primary winding and first, second, third, and fourth secondary windings, the primary winding of said transformer being connected to a supply of alternating current;
a first rectifier connected across the first secondary winding of said transformer, said first rectifier having a positive output terminal and a negative output terminal;
a second rectifier connected across the second secondary winding of said transformer, said second rectifier having a positive output terminal and a negative output terminal;
a third rectifier connected across the third secondary winding of said transformer, said third rectifier having a positive output terminal and a negative output terminal;

a fourth rectifier connected across the fourth secondary winding of said transformer, said fourth rectifier having a positive output terminal and a negative output terminal;

a first diode connected between the positive output terminal of said third rectifier and the first electrode in said process chamber;

a first transistor connected between the negative output terminal of said second rectifier and the positive output terminal of said third rectifier;

a second transistor and a second diode connected in series between the negative output terminal of said first rectifier and the positive output terminal of said third rectifier;

a third diode connected between the negative output terminal of said second rectifier and the second electrode in said process chamber;

a first inductor connected in series between the positive output terminal of said first rectifier and the first electrode in said process chamber;

a second inductor connected in series between the negative output terminal of said second rectifier and said first transistor;

a third inductor connected in series between the positive output terminal of said third rectifier and said first transistor;

a fourth inductor connected in series between the negative output terminal of said fourth rectifier and the second electrode in said process chamber;

a first capacitor connected in series between the negative output terminal of said first rectifier and the first electrode in said process chamber;

a second capacitor connected in series between said first transistor and the negative output terminal of said first rectifier;

a third capacitor connected in series between the negative output terminal of said third rectifier and the first transistor;

a fourth capacitor connected in series between the positive output terminal of said fourth rectifier and the second electrode in said process chamber; and control means connected to said first and second transistors for switching said first and second transistors between conducting and non-conducting states, said control means also being operatively associated with the first and second electrodes in said process chamber and responsive to changes in the impedance of said process chamber, wherein said control means switches said first and second transistors between the conducting and non-conducting states to connect said first, second, third, and fourth rectifiers in various series and parallel combinations to the first and second electrodes in said process chamber to compensate for changes in the impedance of the process chamber.

15. A method for producing a plasma, comprising the steps of:

providing a process chamber having a first electrode and a second electrode, said process chamber being adapted to receive a process gas and maintain the process gas within a predetermined pressure range, the process chamber having a variable impedance;

connecting an autoranging power supply to the first and second electrodes in the process chamber, the autoranging power supply being operable in a first range of operation and a second range of operation;

sensing an impedance of the plasma; and operating the autoranging power supply in the first range of operation if the impedance of the plasma is less than a predetermined impedance and operating the autoranging power supply in the second range of operation if the impedance of the plasma is greater than the predetermined impedance.

16. An autoranging power supply for supplying power to an external load, the external load having a variable impedance, comprising:

a transformer having a primary winding and a secondary winding, the primary winding having a plurality of taps, the secondary winding being connected across the external load;

switching means associated with the primary winding of said transformer for connecting and disconnecting the plurality of taps of the primary winding to an external power source; and control means connected to said switching means for operating said switching means, said control means also being operatively associated with the external load and responsive to changes in the impedance of the external load, wherein said control means operates said switching means so that said switching means connects and disconnects selected ones of the plurality of taps of the primary winding of said transformer to the external power source to compensate for changes in the impedance of the external load.

17. An autoranging power supply for supplying power to an external load, the external load having a variable impedance, comprising:

a transformer having a primary winding and a secondary winding, the primary winding being connected to an external power source, the secondary winding having a plurality of taps;

switching means associated with the secondary winding of said transformer for connecting and disconnecting the plurality of taps of the secondary winding to the external load;

control means connected to said switching means for operating said switching means, said control means also being operatively associated with the external load and responsive to changes in the impedance of the external load, wherein said control means operates said switching means so that said switching means connects and disconnects selected ones of the plurality of taps of the secondary winding of said transformer to the external load to compensate for changes in the impedance of the external load.

18. An autoranging power supply for supplying power to an external load, the external load having a first input terminal, a second input terminal, the external load also having a variable impedance, comprising:

a transformer having a primary winding and first, second, third, and fourth secondary windings, the primary winding being connected to a supply of alternating current;

a first rectifier connected across the first secondary winding of said transformer, said first rectifier having a positive output terminal and a negative output terminal, the positive output terminal of said first rectifier being connected to the first input terminal of the external load;

a second rectifier connected across the second secondary winding of said transformer, said second rectifier having a positive output terminal and a negative output terminal, the positive output terminal of said second rectifier being connected to the negative output terminal of said first rectifier;

a third rectifier connected across the third secondary winding of said transformer, said third rectifier having a positive output terminal and a negative output terminal;

a fourth rectifier connected across the fourth secondary winding of said transformer, said fourth rectifier having a positive output terminal and a negative output terminal, the positive output terminal of said fourth rectifier being connected to the negative output terminal of said third rectifier, the negative output terminal of said fourth rectifier being connected to the second input terminal of the external load;

a first diode connected between the positive output terminal of said third rectifier and the first input terminal of the external load;

a first transistor connected between the negative output terminal of said second rectifier and the positive output terminal of said third rectifier;

a second transistor and a second diode connected in series between the negative output terminal of said first rectifier and the positive output terminal of said third rectifier;

a third diode connected between the negative output terminal of said second rectifier and the second input terminal of the external load;

a range control circuit connected to said first and second transistors, said range control circuit also being operatively associated with the first and second input terminals of the external load and responsive to changes in the impedance of the external load, said range control circuit switching said first and second transistors between the conducting and non-conducting states to connect said first, second, third, and fourth rectifiers in various serial and parallel combinations to the first and second input terminals of the external load to compensate for changes in the impedance of the external load.

19. The autoranging power supply of claim 18, further comprising:

a first inductor connected in series between the positive output terminal of said first rectifier and the first input terminal of the external load;

a second inductor connected in series between the negative output terminal of said second rectifier and said first transistor;

a third inductor connected in series between the positive output terminal of said third rectifier and said first transistor; and a fourth inductor connected in series between the negative output terminal of said fourth rectifier and the second input terminal of the external load.

20. The autoranging power supply of claim 19, further comprising:

a first capacitor connected in series between the negative output terminal of said first rectifier and the first input terminal of the external load;

a second capacitor connected in series between said first transistor and the negative output terminal of said first rectifier;

a third capacitor connected in series between the negative output terminal of said third rectifier and the first transistor; and a fourth capacitor connected in series between the positive output terminal of said fourth rectifier and the second input terminal of the external load.

21. The autoranging power supply of claim 20, wherein the supply of alternating current comprises a switchmode inverter drive circuit.

22. An autoranging power supply for supplying power to an external load, the external load having a variable impedance, comprising:

a power output section having a plurality of pairs of output terminals, each of the plurality of pairs of output terminals having predetermined voltage and current ratings;

a switch network operatively associated with said power output section of said autoranging power supply, said switch network selectively connecting and disconnecting the plurality of pairs of output terminals to the external load; and a range control circuit operatively associated with said switch network and the external load, the range control circuit sensing changes in the impedance of the external load and operating said switch network to connect and disconnect selected ones of the plurality of pairs of output terminals of said power output section to the external load to compensate for impedance variations in the external load and to prevent from being exceeded the maximum voltage and current ratings for each of said plurality of pairs of output terminals.

23. An autoranging power supply for supplying power to an external load, the external load having a variable impedance, comprising:

a power output section operable in a first impedance range and a second impedance range;

a switch network operatively associated with said power output section of said autoranging power supply, said switch network switching the power output section between operation in the first impedance range and the second impedance range; and a range control circuit connected to said switch network and to the external load, the range control circuit determining changes in the impedance in the external load and operating said switch network to switch the power output section between operation in the first and second impedance ranges based on the changes in the impedance in the external load.

* * * * *